(12) United States Patent
Lauritsen et al.

(10) Patent No.: US 9,759,198 B2
(45) Date of Patent: Sep. 12, 2017

(54) WIND TURBINE BLADE

(71) Applicant: VESTAS WIND SYSTEMS A/S, Aarhus N (DK)

(72) Inventors: Steen M. Lauritsen, Egå (DE); Jonas Romblad, Risskov (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 574 days.

(21) Appl. No.: 14/366,586

(22) PCT Filed: Dec. 19, 2012

(86) PCT No.: PCT/DK2012/050477
§ 371 (c)(1),
(2) Date: Jun. 18, 2014

(87) PCT Pub. No.: WO2013/091648
PCT Pub. Date: Jun. 27, 2013

(65) Prior Publication Data
US 2015/0003998 A1  Jan. 1, 2015

Related U.S. Application Data

(60) Provisional application No. 61/579,658, filed on Dec. 23, 2011.

(30) Foreign Application Priority Data

Dec. 21, 2011  (DK) .................................. 2011 70738

(51) Int. Cl.
*F01D 5/08*  (2006.01)
*F03D 11/00*  (2006.01)
(Continued)

(52) U.S. Cl.
CPC ........ *F03D 11/0025* (2013.01); *F03D 1/0675* (2013.01); *F03D 80/40* (2016.05); *F05B 2260/20* (2013.01); *Y02E 10/721* (2013.01)

(58) Field of Classification Search
CPC ........ F03D 80/40; F03D 80/30; F03D 1/0675; F01D 5/08; F03B 2260/20
(Continued)

(56) References Cited

U.S. PATENT DOCUMENTS 2,556,736 A * 6/1951 Palmatier ............... B64D 15/02
239/76
7,244,102 B2 * 7/2007 Delucis ................. F03D 1/0658
415/908
(Continued)

FOREIGN PATENT DOCUMENTS

WO  2011/087414 A1   7/2011
WO  2011/096851 A1   8/2011

OTHER PUBLICATIONS

International Search Report for PCT/DK2012/050477, Apr. 3, 2013.
Danish Search Report for PA 2011 70738, Jul. 12, 2012.

*Primary Examiner* — Craig Kim
*Assistant Examiner* — Jason Fountain
(74) *Attorney, Agent, or Firm* — Patterson + Sheridan, LLP

(57) ABSTRACT

A wind turbine blade having an elongated blade body extending along a longitudinal axis and having an upper skin and a lower skin, the lower skin spaced from the upper skin in a thickness direction of the blade body, the upper skin and/or lower skin having a laminated layer, the laminated layer having an outer layer wherein the outer layer forms part of the upper and/or lower skin respectively, an inner layer spaced from the outer layer in the thickness direction; and an intermediate layer sandwiched between the outer layer and inner layer, the intermediate layer having a plu-
(Continued)

rality of openings extending through the intermediate layer from the inner layer to the outer layer; and a plurality of corresponding heat conductor elements extending through the plurality of openings from the inner layer to the outer layer for transferring heat from the inner layer to the outer layer.

20 Claims, 6 Drawing Sheets

(51) Int. Cl.
  *F03D 1/06* (2006.01)
  *F03D 80/40* (2016.01)

(58) Field of Classification Search
  USPC ....... 416/97 A, 96 R, 229 R, 230; 244/134 R
  See application file for complete search history.

(56) References Cited

U.S. PATENT DOCUMENTS

| | | | |
|---|---|---|---|
| 9,421,742 B2* | 8/2016 | Grove-Nielsen | B32B 27/00 |
| 2008/0099617 A1* | 5/2008 | Gilmore | B64D 15/14 |
| | | | 244/134 R |
| 2008/0181775 A1 | 7/2008 | Livingston et al. | |
| 2010/0034652 A1 | 2/2010 | Battisti | |
| 2013/0028738 A1* | 1/2013 | Nordin | H05B 3/145 |
| | | | 416/39 |

* cited by examiner

WIND TURBINE BLADE

FIELD OF INVENTION

The present invention relates to a wind turbine blade, such as, a self-deicing wind turbine blade of a wind turbine.

BACKGROUND

During the operation of a wind turbine in cold weather, it is very likely that ice may be formed on the surface of wind turbine blades due to freezing of water on the cold surface. The accumulation of ice on the surface can result in undesirable consequences. For example, a change in the profile of the wind turbine blades due to the accumulation of ice reduces the lift-drag ratio of the airfoil which can result in a decrease in the speed of rotation of the wind turbine. When this happens, the wind turbine is unable to obtain optimal speed and efficiency of the wind turbine is reduced. In addition, the weight of the ice accumulated on the wind turbine blades would add weight to the blades and cause stress on the blades. This may result in stress failure in the blades.

There have been many attempts made to remove the ice that has accumulated on the surfaces. One of the attempts is the application of a coating that is capable of preventing adhesion of ice on the blade, e.g. Teflon® coating onto an underlying painted surface of the blade so that ice can slip off the coating and is prevented from accumulating on the surface. However, the application of the coatings can be costly and repeat applications of the coatings to replace worn out coatings would increase cost and downtime of the machines. In another attempt, deicing fluid has been used to dislodge the ice from the surface. However, the application of deicing fluid requires the blades to be stationery and not only does it require a downtime of the turbine, it is seemingly not effective in preventing the accumulation of ice on the blades. Yet another attempt of deicing wind turbine blade is the installation of heating panels on the blade to melt the ice. However, this method affects the aerodynamics of the blade and hence the efficiency of the blade and is expensive and difficult to maintain.

The present invention aims to provide a wind turbine blade capable of deicing ice accumulated on it without the disadvantages discussed above.

SUMMARY OF THE INVENTION

The present invention provides a wind turbine blade having an elongated blade body extending along a longitudinal axis and having a blade root at one longitudinal end of the blade body and a blade tip at another longitudinal end of the blade body; a leading edge and a trailing edge, both extending from the blade root to the blade tip, the trailing edge spaced from the leading edge in a span-wise direction of the blade body; an upper skin and a lower skin extending from the leading edge to the trailing edge and from the blade root to the blade tip, the lower skin spaced from the upper skin in a thickness direction of the blade body, the upper skin and the lower skin defining a space therebetween, the upper skin and/or lower skin comprises a laminated layer extending from the blade root towards the blade tip and at least adjacent from or from the leading edge towards the trailing edge, the laminated layer having an outer layer wherein the outer layer forms part of the upper and/or lower skin respectively; an inner layer spaced from the outer layer in the thickness direction of the blade body; and an intermediate layer sandwiched between the outer layer and inner layer, the intermediate layer having a plurality of openings extending through the intermediate layer from the inner layer to the outer layer; and a plurality of corresponding heat conductor elements extending through the plurality of openings from the inner layer to the outer layer for transferring heat from the inner layer to the outer layer. The invention increases the rate of heat transfer between the inner layer and outer layer. The invention further provides a wind turbine provided with a wind turbine blade as disclosed hereto.

According to an aspect of the present invention, there are more than two, three or four of the openings and/or heat conductor elements within the intermediate layer between the outer and inner layers.

According to another aspect, the outer layer completely forms the upper and/or lower skin.

According to another aspect, the openings and/or heat conducting elements span through the intermediate layer from or from about the blade root towards or to the blade tip and/or from or from about the leading edge towards or to the trailing edge and are spaced apart from each other wherein the spacing between the openings or the heat conducting elements is the same or varies or may be the same at a portion of the intermediate layer and vary at another portion of the intermediate layer.

According to another aspect, the openings and/or heat conducting elements are arranged in a discrete or non-continuous arrangement or a continuous arrangement.

According to another aspect, the openings or heat conducting elements, in a discrete arrangement, are spaced apart from each other in the longitudinal direction and span-wise direction of the blade body or both.

According to another aspect, in the discrete arrangement, the openings include cylindrical holes and/or the heat conducting elements include cylindrical poles or rods.

According to another aspect, the openings and/or heat conducting elements, in a continuous arrangement, are extended from or from about the blade root towards or to the blade tip.

According to another aspect, in the continuous arrangement, the openings include slots and/or the heat conducting elements include strips.

According to another aspect, the intermediate layer comprises or is formed by a foam layer.

According to another aspect, the concentration of openings and/or heat conducting elements and/or the number of openings and/or heat conducting elements per unit area running adjacent the leading edge is higher than the concentration of openings and/or heat conducting elements and/or the number of openings and/or heat conducting elements per unit area along the blade body away from the leading edge.

According to another aspect, the blade further comprises heat transfer paths adjacent the inner layer and within the space between the upper and lower skins, the heat transfer paths extending longitudinally from the blade root towards or to the blade tip for conducting heat from the blade root towards or to the blade tip so as to transfer the heat to the heat conducting elements via the inner layer.

According to another aspect, the heat transfer paths include channels adapted to guide a heat transfer fluid therealong such that heat is transferred from the blade root towards or to the blade tip via the fluid.

According to another aspect, the wind turbine blade further comprising a return fluid duct within the space between the upper and lower skins and in fluid communication with the channels for directing the fluid back towards the blade root so that the fluid can be re-circulated into the channels.

According to another aspect, the wind turbine blade further comprising an exhaust vent through the upper or lower skin, the exhaust air vent being in fluid communication with the channels for releasing the fluid into the environment.

According to another aspect, the fluid is air.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Figure 1:
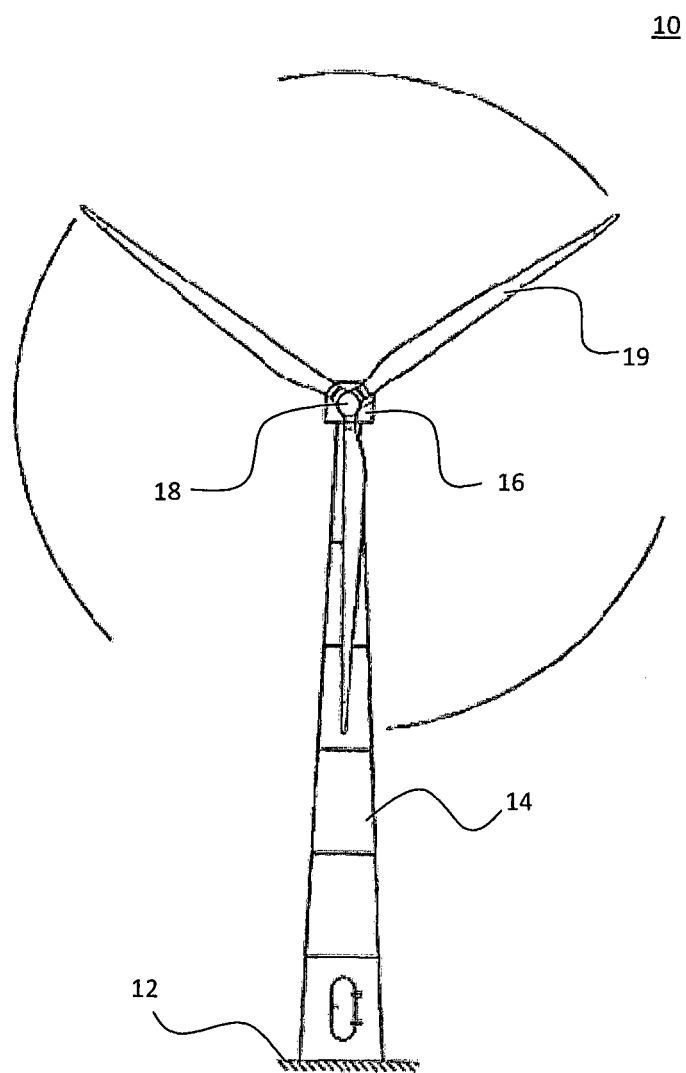
FIG. 1 shows a common setup of a wind turbine.

FIG. 1 shows a common setup of a wind turbine 10 which includes embodiments of wind turbines blades 20 according to the present invention. The wind turbine 10 is mounted on a base 12. The wind turbine 10 includes a tower 14 having a number of tower sections. A wind turbine nacelle 16 is placed on top of the tower 14. A wind turbine rotor, connected to the nacelle 16, includes a hub 18 and at least one rotor blade or wind turbine blade, e.g. three wind turbine blades 20. The wind turbine blades 20 are connected to the hub 18 which in turn is connected to the nacelle 16 through a low speed shaft which extends out of the front of the nacelle 16.

Figure 2:
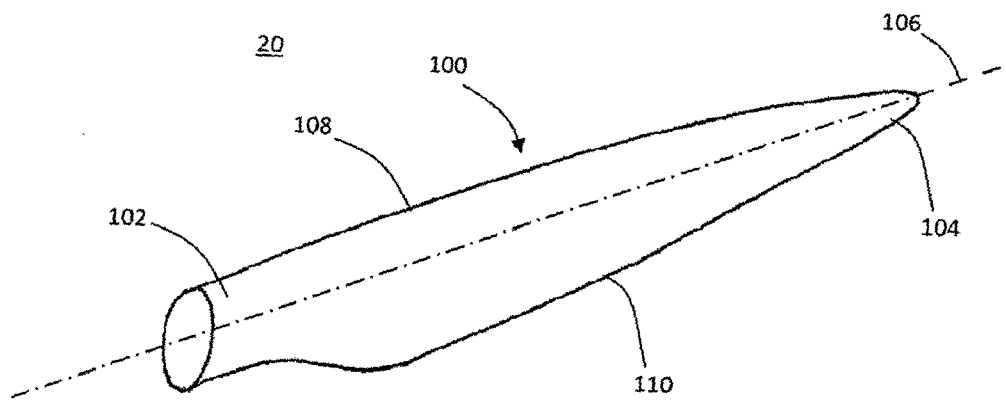
FIG. 2 shows a perspective view of an embodiment of a wind turbine blade of the present invention.

FIG. 2 shows an exemplary embodiment of the present invention. As shown in FIG. 2, the wind turbine blade 20 has an elongated blade body 100 which extends along a longitudinal axis 106. The blade body 100 has a root 102 at one longitudinal end of the blade body 100 and a tip 104 at the other longitudinal end of the blade body 100. The root 102 being connectable to the hub 18 of the wind turbine 10 (not shown in FIG. 2) and the tip 104 being a free end of the blade body 100. The blade body 100 has an airfoil cross-sectional area (see FIG. 2), perpendicular to the longitudinal axis 106 of the blade body 100 and the cross-sectional area proximate the root 102 may be larger than the cross-sectional area proximate the tip 104 and the cross-sectional area of the blade body 100 at about the blade root 102 reduces along the longitudinal axis 106 to the tip 104. The blade body 100 has a leading edge 108 (edge contacting the wind first) extending substantially from the root 102 to the tip 104 and a trailing edge 110 (edge where the wind leaves the blade) spaced from the leading edge 108 in a span-wise direction of the blade body 100. Both edges extending substantially from the root 102 to the tip 104 opposite and spaced from the leading edge 108 in a span-wise direction of the blade body 100.

Figure 3:
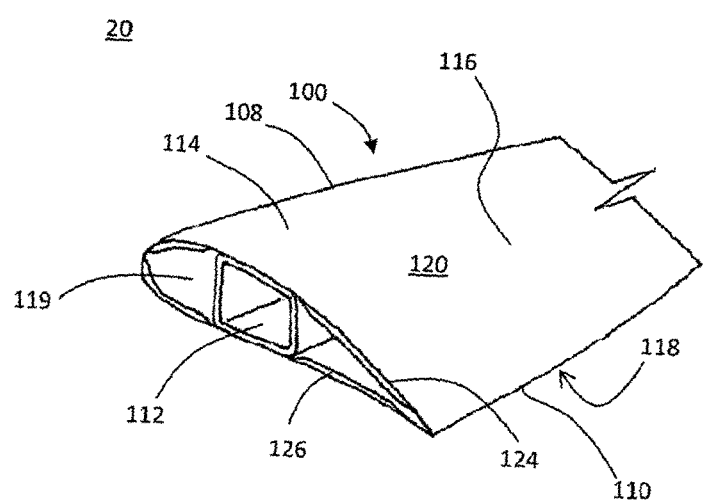
FIG. 3 shows a perspective view of the embodiment in FIG. 2 with a portion of the blade body removed.

As shown in FIG. 3, the blade body 110 may have a spar 112, for example, of a tubular cross-section within the blade body 100 and the spar 112 may extend substantially along the length of the blade body 110 from about the blade root 102 to the blade tip (although only a portion of the length of the spar 112 is shown in FIG. 2) to provide structural strength and integrity to the blade body 110. The shape of the blade body 100 may be formed by a shell 114 which is attached to the spar 112 as shown in FIG. 3. The shell 114 has an airfoil cross-section as shown in FIG. 2. The shell 114 is formed by an upper skin 116 and a lower skin 118 spaced from the upper skin 116 in the thickness direction of the blade body 100 such that the upper skin 116 and the lower skin 118 defines a space 119 therebetween. Both upper and lower skins 116,118 extend from the leading edge 108 to the trailing edge 110 and from the blade root 102 to the blade tip 104. The upper skin 116 forms a suction surface 120 of the airfoil profile of the blade body 100 and the lower skin 118 forms a pressure surface 122 (not shown in FIG. 3) of the airfoil profile of the blade body 100. Accordingly, the suction surface 120 and the pressure surface 122 are spaced apart from each other in the thickness direction.

In FIG. 3, upper and lower skins 116,118 comprise an upper laminated layer 124 and a lower laminated layer 126, both the upper and lower laminated layer 124,126 extend from the blade root 102 towards the blade tip 104 and at least adjacent from or from the leading edge 108 to the trailing edge 110 of the blade body 110. The laminated layers 124,126 may extend from the blade root 102 to the blade tip 104. The laminated layer 124,126 extends from at least adjacent from or from the leading edge 108 towards the trailing edge 110. Alternatively, although not shown in the figures, the laminated layers 124,126 may have a substantially uniform thickness which extends at least adjacent from or from the leading edge 108 to at least adjacent to or to the trailing edge 110. Although it is shown in FIG. 3 that both the upper skin 116 and lower skin 118 comprise of laminated layer, it is possible that only one of the skins 116,118 has laminated layer. As shown in FIG. 3, the laminated layers 124,126 have a substantially uniform thickness between the leading edge 108 and spar 112 and between the trailing edge 110 and spar 112 apart from the portions proximate the leading and trailing edges 108,110 and spar 112 where the laminated layers 124,126 decreases in thickness as they approach the leading and trailing edges 108,110 and spar 112 respectively. Alternatively, the laminated layers 124,126 may be extended to areas of the skins 116,118 where heating of the skin is required.

Figure 4:
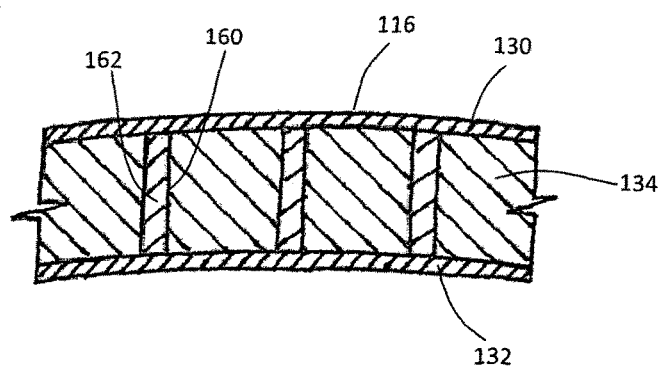
FIG. 4 shows a close-up view of a laminated portion of the present invention.

In FIG. 4, a closed-up sectional view of an embodiment of the upper laminated layer 124 is shown. In the following description, the upper laminated layer 124 is used to show the composition of the laminated layers 124,126. However, the description is also applicable to the lower laminated layer 126 accordingly. Upper laminated layer 124 has an outer layer 130, an inner layer 132 spaced from the outer layer 130 in the thickness direction of the blade body 100. The inner layer 132 is spaced in the thickness direction towards the lower laminated layer 126 (see FIG. 3). Outer layer 130 forms the upper skin 116 when the laminated layer 124 extends an area corresponding to the upper skin 116 or part of the upper skin 116 of the blade body 100 when the laminated layer 124 extends an area smaller than the upper skin 116. The inner layer 132 adjacent the space 119 in the blade body 100 (see FIG. 9). An intermediate layer 134 is sandwiched between the outer layer 130 and inner layer 132. The intermediate layer 134 has a plurality of openings 160 extending through intermediate layer 134 from the inner layer 132 to the outer layer 130. A plurality of corresponding heat conductor elements 162 extend through the plurality of openings 160 from the inner layer 132 to the outer layer 130 for transferring heat from the inner layer 132 to the outer layer 130. The openings 160 span through the intermediate layer 134 in a span-wise direction of the blade body 100 and between the inner layer 132 and outer layer 130 and are spaced apart from each other. The spacing between the openings 160 may be the same or may vary through the intermediate layer 134. The spacing may be the same at a portion of the intermediate layer 134 and vary at another portion of the intermediate layer 134. The openings 160, may be of a discrete or non-continuous arrangement in the intermediate layer (see FIG. 6), e.g. cylindrical holes wherein the holes extend from the inner layer 132 to the outer layer 134 or a continuous arrangement (see FIG. 5), e.g. slots, as will be shown later.

Correspondingly, the heat conductor elements 162 may be in a discrete or non-continuous arrangement, e.g. pole or rod, or a continuous arrangement, e.g. strips. In a discrete arrangement, the openings or heat conducting elements may be spaced apart from each other in the longitudinal direction and span-wise direction of the blade body 100 or both. In the continuous arrangement, the openings or heat conducting elements may be extended from or from about the blade root 102 towards or to the blade tip 104. The openings 160 and heat conducting elements 162 may be arranged by having a mixture of discrete and continuous arrangement, e.g. slots and cylindrical openings may be arranged within the intermediate layer and spaced apart from each other. Although, heat conducting elements 162 have been shown, the intermediate layer 134 may be formed by a heat conducting material to maximise the rate of heat transfer between the inner and outer layers 132,130.

Figure 5:
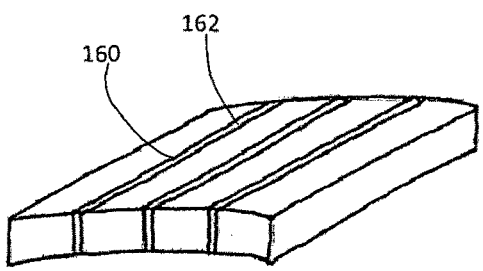
FIG. 5 shows a perspective view of a section of an embodiment of the intermediate layer in FIG. 3.

A portion of the intermediate layer 134 is shown in FIG. 5. FIG. 5 shows a continuous arrangement of the openings 160 and heat conducting elements 162. The openings 160, e.g. slots, may extend in a width-wise direction (thickness direction of the blade body 100) from the inner layer 132 to the outer layer 130 and in a length-wise direction (longitudinal direction of blade body 100) from the blade root 102 towards or to the blade tip 104 within the intermediate layer 134. Within the openings 160 are the corresponding heat conducting elements, e.g. strips. The heat conducting elements 162 extends in a similar fashion as the openings 160 which may be in the longitudinal direction of the blade body 100 from or from about the blade root 102 towards or to the blade tip 104. The heat conducting elements 562 extend in a thickness direction of the blade body 100 from the inner layer 132 to the outer layer 130. The heat conducting elements 162 are thermally connected to the outer layer 130 and inner layer 132.

Figure 7:
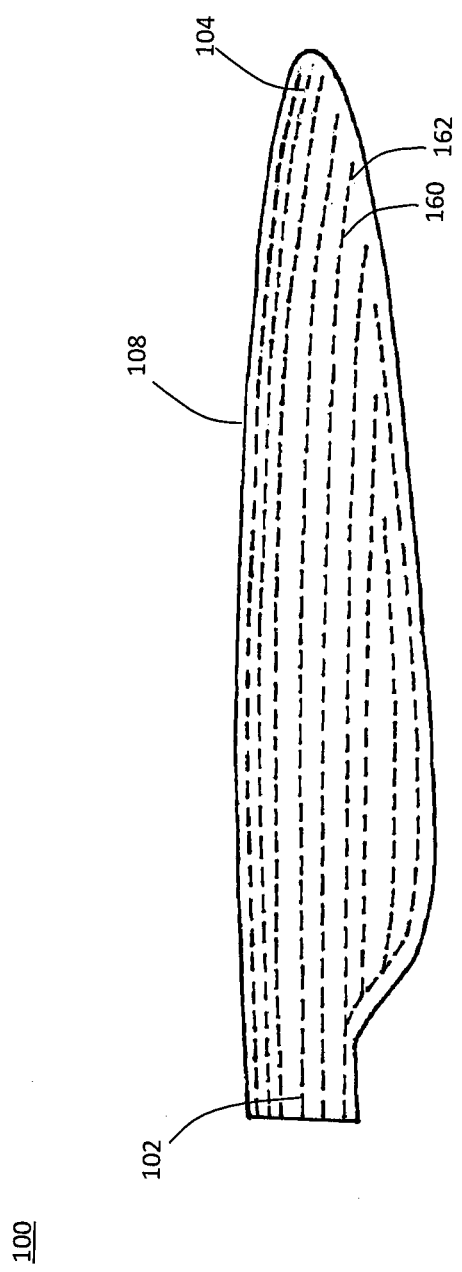
FIG. 7 shows a top view of the embodiment in FIG. 5 with opening and heat conducting elements (shown in hidden lines) in a continuous arrangement and having a varying concentration of openings and heat conducting elements in the span-wise direction of the blade body.

As shown in FIG. 7, the openings 160 and heat conductor elements 162 (shown by hidden lines) are spanned across and through the intermediate layer 134 along the blade body 100 from or from about the blade root 102 towards or to the blade tip 104 and from or from about the leading edge 108 towards or to the trailing edge 110. As shown in FIG. 7, the openings 160 and heat conductor elements 162 may be substantially parallel to each other from or from about the blade root 102 towards or to the blade tip 104 in the intermediate layer 134. The heat conducting elements 162 may be parallel to the leading edge 108 to provide continuous heating along that edge. The spacing between the heat conducting elements 162 may be equal throughout the width in the span-wise direction of the blade body 100 or may vary. The spacing may be reduced or increased to increase or lower the concentration or number of heat conducting elements 162 per unit area of skin 116,118. The span-wise spacing of the heat conducting elements 162 may be varied according to the heating requirement of the blade body 100. For example, as shown in FIG. 7, if more heating is required in the proximity of the leading edge 108, the concentration of the heat conducting elements 162 and/or the number of heat conducting elements 162 per unit cross-sectional area running adjacent the leading edge 108 may be higher than the concentration and/or number of heat conducting elements 162 per unit area along the blade body 100 away from the leading edge 108. The spacing may have an effect on the structural strength of the skin 116,118 and the determination of the spacing may depend on the design requirements, e.g. loading on the blade body 100, heating requirement.

Figure 6:
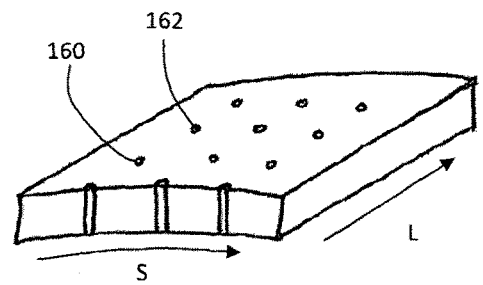
FIG. 6 shows a perspective view of a section of another embodiment of the intermediate layer FIG. 3.

In an alternative embodiment to FIGS. 4 and 5 is shown in FIG. 6. FIG. 6 shows a discrete or non-continuous arrangement of the openings 160 and heat conducting elements 162. The openings 160 may be cylindrical holes and each opening 160 is being spaced from one another in the longitudinal and/or span-wise direction. In FIG. 6, the openings 160 are arranged in a plurality of rows whereby the openings 160 in each row are spaced equally from each other in the span-wise direction (see arrow S) and each row is spaced from the other with substantially the same spacing in the longitudinal direction (see arrow L). The spacing between the openings 160 and/or rows may be the same or may vary. The spacing may be the same at a portion of the intermediate layer 134 and vary at another portion of the intermediate layer 134. Correspondingly, each opening 160 has a heat conducting element 162, which may be a cylindrical rod or pole, and extends from the inner layer 132 to the outer layer 430 (see FIG. 7) through the openings 160 to conduct heat from the inner layer 132 to the outer layer 130 (see FIG. 7). The heat conductor elements 162 may be made of heat conducting material that does not conduct electrically, e.g. boron nitride. The openings 160 may be of any other cross-sectional shapes e.g. quadrilateral, hexagonal. The cross-sectional shape of the heat conducting elements 162 may correspond with the shape of the opening 160 or may be of a different shape, e.g. circular, octagonal, as long as the heat conducting element 162 can go through the openings 160. The cross-sectional shape of the heat conducting element 162 should complement the shape of the openings 160 to prevent gaps between both as gaps may reduce the structural strength of the laminate.

Figure 8:
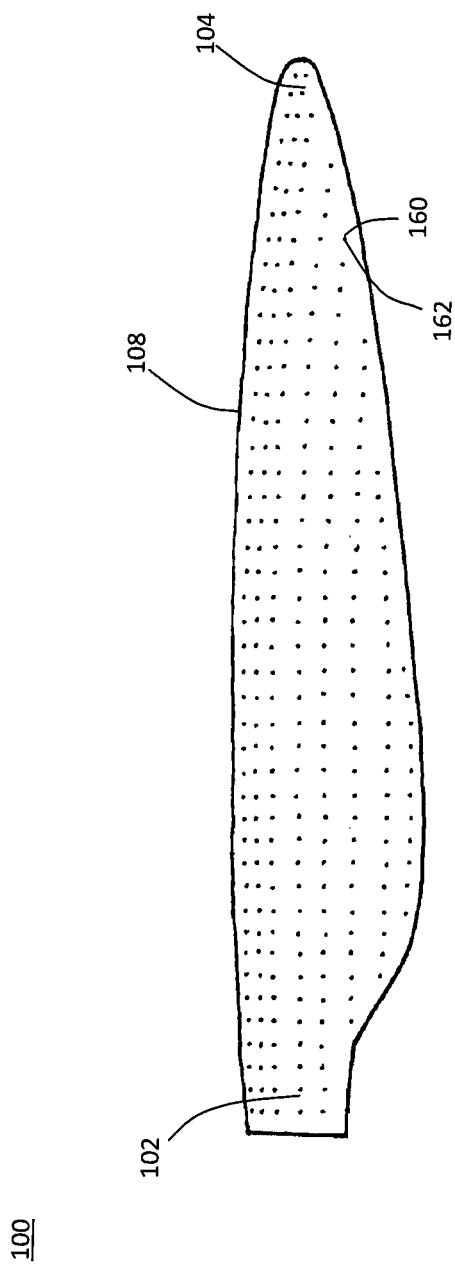
FIG. 8 shows a top view of the embodiment in FIG. 6 with opening and heat conducting elements (shown in hidden lines) in a discrete arrangement and having a varying concentration of opening and heat conducting elements in the span-wise direction of the blade body.

As shown in FIG. 8, the openings 160 and heat conductor elements 162 (shown by hidden dots) are spanned across and through the intermediate layer 134 along the blade body 100 from or from about the blade root 102 towards or to the blade tip 104 and from or from about the leading edge 108 towards or to the trailing edge 110. The concentration or the number of the openings 160 and heat conductor elements 162 per unit area of the skin 416,418 may be adjusted according to the heating requirement of the blade body 100. For example, as shown in FIG. 7, if more heating is required in the proximity of the leading edge 108, the concentration and/or the number of openings 160 and heat conductor elements 162 per unit area adjacent the leading edge 108 may be higher than the concentration and/or number of openings 160 and heat conductor elements 162 per unit area away from the leading edge 108. The openings 160 and heat conductor elements 162 may be spaced equally in the longitudinal and span-wise direction of the blade body 100. Accordingly, it is possible to vary the concentration of the openings 160 and heat conductor elements 162 at any area of the blade body 100 that requires higher rate of heat transfer. The spacing may have an effect on the structural strength of the skin 116,118 and the determination of the spacing may depend on the design requirements, e.g. loading on the blade body 100, heating requirement.

Outer and inner layers 130,132 may be made of reinforced plastics or resins e.g. fibreglass material, carbon. The laminated layers 124,126 may provide structural strength to the construction of the blade 20. In the present embodiment, the intermediate layer 134 may be formed by a foam layer 136 or equivalent.

Figure 9:
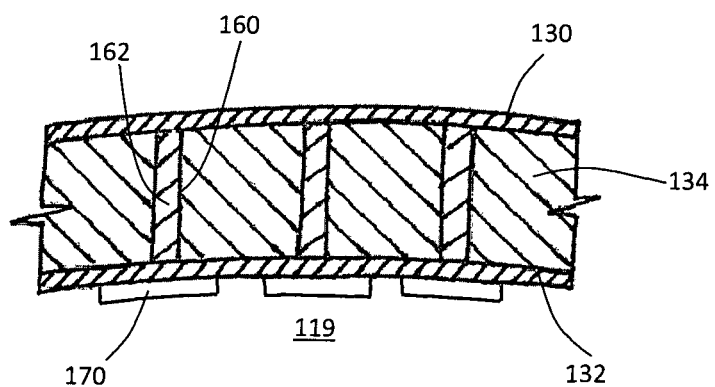
FIG. 9 shows the embodiment in FIGS. 5 and 6 having a heat transfer path adjacent the inner layer.

As shown in FIG. 9, in the present embodiments of FIGS. 5 and 6, the blade body 100 may include a plurality of heat transfer paths 170 for transferring heat to heat conducting elements 162 within and/or through the space 119 (see FIG. 3) between the upper skin 116 and lower skin 118. The heat transfer paths 170 may extend in a longitudinal direction of the blade body 100 from the blade root 102 towards the blade tip 104 or from the blade root 102 to the blade tip 104. The heat transfer paths 170 may extend longitudinally adjacent to the inner layer 132 through space 119 and may conduct heat to the heat conducting element 162. The heat transfer paths 170 may be a single continuous layer which extends longitudinally from the blade root 102 towards or to the blade tip 104 and in a span-wise direction from or from about the leading edge 108 towards or to the trailing edge 110 to transfer heat to a plurality of heat conducting elements 162. The heat transfer paths 170 as shown in FIG. 9 may be spaced equally from each other or the spacing between each other may vary.

The plurality of heat transfer paths 170 may be channels adapted to guide a heat transfer fluid, which may be gas, heated air or liquid, therealong such that heat is transferred from the blade root 102 towards or to the blade tip 104 via the fluid when the fluid upon heated is transmitted from the blade root 102 towards or to the blade tip 104 (not shown in FIG. 4) within the channels. Heat transfer paths 170 may be any solid material that is able to conduct heat, e.g. boron nitride, which conducts heat from the blade root 102 towards or to the blade tip 104. The wind turbine 20 may include a heater which the heat transfer paths 170 may be connected to for generating heat. The generated heat is conveyed to the heat transfer paths and the heat from the heat transfer paths 170 may be transferred via the inner layer 132 to the heat conducting elements 162. The heat conducting elements 162 conducts the heat from the inner layer 132 to the outer layer 130. And the heat travels through the outer layer 130 to any ice that is accumulated on the outer layer 130, i.e one of skins 116,118, and thereby melting the accumulated ice.

For an embodiment wherein the heat transfer paths 170 includes a heat conductor, the heat generated by the heater is conducted from the heater (via conduction) to the heat conducting elements 162 via the conductors to heat up the heat conducting elements 162.

For an embodiment wherein the heat transfer paths 170 include channels, the heat generated by the heater is transferred from the heater to the fluid. For this embodiment with channels, the wind turbine 20 may include a pump in fluid communication with the heat transfer paths 140 for pumping the fluid into the channels. The heater, pump and channels may form a close-circuit heating system wherein the fluid that is heated and pumped into the channels may be re-circulated via a return duct (to be described later) and heated and pumped back again into the channels. The heating system may be an open system wherein the fluid which is heated and pumped into the channels may be exhausted into the environment via an exhaust vent (to be described later). The heating system may include a reservoir of fluid for holding the fluid wherein the reservoir of fluid is connected to and in fluid communication with the channels. The heating system may also include the pump in fluid communication with the reservoir of fluid and the channels for pumping the fluid from the reservoir into the channels. The reservoir of fluid may be heated up by the heater and the heated fluid may be pumped from the reservoir into the channels and via the channels to heat up the inner layer 134 (via heat convection) so as to transfer the heat to the heat conducting element 162 via the inner layer 134. The heat is efficiently conducted through the heat conducting element 162 to the ice via the outer layer 130 to de-ice the blade body 100.

The heater may include heating elements and/or a heat exchanger for heating the fluid. The heating elements or heat exchanger may be located between the pump and channels or within the channels so that fluid may be pumped along or through the heating element or through the heat exchanger to be heated up before or after entering the channels. The heating elements or heat exchanger may be located in the reservoir of fluid to heat up the fluid before being pumped into the channels. The heater, pump and reservoir of fluid may be located in the hub 18 or nacelle 16, in any case, out of the wind turbine blades 20, where they do not interfere in the rotation of the blades 20.

Additionally, the blade body 100 may include a return fluid duct (not shown in figures) as mentioned earlier within the space 119 and in fluid communication with the channels for directing the fluid back towards the blade root 102 so that the fluid can be re-circulated into the channels. The return fluid duct, as understood by a skilled person, may be incorporated into any one of the above embodiments shown and may be incorporated within the space 119 between the skins 116,118. The fluid may be released into the space 119 and returned towards the blade root 102 through the space 119 via natural or forced convection by a pump.

Additionally, the blade body 100 may include an exhaust vent as mentioned earlier (not shown in the figures) on one of the skins 116,118, the exhaust vent being in fluid communication with the channels for releasing the fluid into the environment. The exhaust vent may be incorporated into any one of the embodiments mentioned above. The exhaust vent may be implemented together with the return fluid duct into any of the embodiments described above.

The fluid may be pumped from the blade root 102 to the blade tip 104 through the space 119 between the upper and lower skins 116,118. In this case, the space 119 is in fluid communication with the pump and the heater is arranged between the pump and the space 119 to heat the fluid before entering the space 119. The heated fluid, when in contact with the inner layer 132, transfers the heat to the heat conducting elements 162 through the inner layer 132. The heat conducting elements 162 conducts the heat from the inner layer 132 to the outer layer 160 and heats any ice accumulated on the skins 116,118 thereby melting the ice to de-ice the blade 20. The space 119 may be in fluid communication with the exhaust vent so that the fluid may be vent out of the blade body. The space 119 may also comprise a return fluid duct for pumping the fluid back into the blade root 102 for re-circulation via a pump.

Although various types of fluid may be used to transfer heat to the blade body, air is used for the embodiments described. The weight contribution of air to the blades 20 is negligible and does not affect the loading on the blades substantially. Comparatively, the weight contribution of liquid to the blades 20 may be substantial. The weight of the fluid may be more significant during the rotation of the blades 20 due to centrifugal forces. Further, the design requirement for housing and channelling of air is less demanding than that for liquid. In addition, in the event of a leakage of the fluid, the leakage of air into the environment is negligible as compare to the leakage of liquid.

Although not shown in the figures, it is possible that the laminated layers 124,126 have more layers than the three layers mentioned, i.e. outer, intermediate and inner layers 130,132,134, and the heat conducting element 162 may extend from the inner layer 130 to the outer layer 134 through the multiple layers between the inner layer 130 and the outer layer 134.

The material used for the laminated layers 124,126 is may be a non-electrical conductor and yet provide structural strength to the blades. Electrical conducting material used in the wind turbine 10 would pose the wind turbine 10 as a lightning hazard during a thunderstorm. The intermediate layer 134 may be made of a heat conducting material and yet does not conduct electricity so that intermediate layer 134 can effectively conduct thermal energy without being a lightning hazard.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A wind turbine blade, comprising:
    an elongated blade body extending along a longitudinal axis and having a blade root at one longitudinal end of the blade body and a blade tip at another longitudinal end of the blade body;
    a leading edge and a trailing edge, both extending from the blade root to the blade tip, the trailing edge spaced from the leading edge in a span-wise direction of the blade body;
    an upper skin and a lower skin extending from the leading edge to the trailing edge and from the blade root to the blade tip, the lower skin spaced from the upper skin in a thickness direction of the blade body, the upper skin and the lower skin defining a space there-between, the upper skin and/or lower skin comprises:
        a laminated layer extending from the blade root towards the blade tip and at least adjacent from or from the leading edge towards the trailing edge, the laminated layer comprising:
            an outer layer wherein the outer layer forms part of the upper and/or lower skin respectively;
            an inner layer spaced from the outer layer in the thickness direction of the blade body;
            an intermediate layer sandwiched between the outer layer and inner layer, the intermediate layer comprising a plurality of openings extending through the intermediate layer from the inner layer to the outer layer; and
            a plurality of corresponding heat conductor elements extending through the plurality of openings from the inner layer to the outer layer for transferring heat from the inner layer to the outer layer, wherein the openings and/or heat conducting elements are arranged in a discrete or non-continuous arrangement or a continuous arrangement, and wherein, in the discrete or non-continuous arrangement, at least one of the openings include cylindrical holes or the heat conducting elements include cylindrical poles or rods.

2. The wind turbine blade according to claim 1, wherein the plurality of openings and/or heat conductor elements within the intermediate layer between the outer and inner layers includes one of two, three, and four openings and/or heat conductor elements.

3. The wind turbine blade according to claim 1, wherein the outer layer completely forms the upper and/or lower skin.

4. The wind turbine blade according to claim 1, wherein the openings and/or heat conducting elements span through the intermediate layer from or from about the blade root towards or to the blade tip and/or from or from about the leading edge towards or to the trailing edge and are spaced apart from each other wherein the spacing between the openings or the heat conducting elements is the same or varies or may be the same at a portion of the intermediate layer and vary at another portion of the intermediate layer.

5. The wind turbine blade according to claim 1, wherein the openings or heat conducting elements, in a discrete arrangement, are spaced apart from each other in the longitudinal direction and span-wise direction of the blade body or both.

6. The wind turbine blade according to claim 1, wherein the openings and/or heat conducting elements, in a continuous arrangement, are extended from or from about the blade root towards or to the blade tip.

7. The blade according to claim 1, wherein, in the continuous arrangement, the openings include slots and/or the heat conducting elements include strips.

8. The wind turbine blade according to claim 1, wherein a concentration of openings and/or heat conducting elements and/or the number of openings and/or heat conducting elements per unit area running adjacent the leading edge is higher than a concentration of openings and/or heat conducting elements and/or the number of openings and/or heat conducting elements per unit area along the blade body away from the leading edge.

9. The wind turbine blade according to claim 1, wherein the intermediate layer comprises or is formed by a foam layer.

10. A wind turbine, comprising:
an elongated blade body extending along a longitudinal axis and having a blade root at one longitudinal end of the blade body and a blade tip at another longitudinal end of the blade body;
a leading edge and a trailing edge, both extending from the blade root to the blade tip, the trailing edge spaced from the leading edge in a span-wise direction of the blade body;
an upper skin and a lower skin extending from the leading edge to the trailing edge and from the blade root to the blade tip, the lower skin spaced from the upper skin in a thickness direction of the blade body, the upper skin and the lower skin defining a space therebetween, the upper skin and/or lower skin comprises:
a laminated layer extending from the blade root towards the blade tip and at least adjacent from or from the leading edge towards the trailing edge, the laminated layer comprising:
an outer layer wherein the outer layer forms part of the upper and/or lower skin respectively;
an inner layer spaced from the outer layer in the thickness direction of the blade body; and
an intermediate layer sandwiched between the outer layer and inner layer, wherein the intermediate layer comprises or is formed by a foam layer, the intermediate layer comprising:
a plurality of openings extending through the intermediate layer from the inner layer to the outer layer; and
a plurality of corresponding heat conductor elements extending through the plurality of openings from the inner layer to the outer layer for transferring heat from the inner layer to the outer layer.

11. The wind turbine blade according to claim 10, wherein a concentration of openings and/or heat conducting elements and/or the number of openings and/or heat conducting elements per unit area running adjacent the leading edge is higher than a concentration of openings and/or heat conducting elements and/or the number of openings and/or heat conducting elements per unit area along the blade body away from the leading edge.

12. The wind turbine blade according to claim 10, wherein the openings and/or heat conducting elements, in a continuous arrangement, are extended from or from about the blade root towards or to the blade tip.

13. A wind turbine blade, comprising:
an elongated blade body extending along a longitudinal axis and having a blade root at one longitudinal end of the blade body and a blade tip at another longitudinal end of the blade body;
a leading edge and a trailing edge, both extending from the blade root to the blade tip, the trailing edge spaced from the leading edge in a span-wise direction of the blade body;
an upper skin and a lower skin extending from the leading edge to the trailing edge and from the blade root to the blade tip, the lower skin spaced from the upper skin in a thickness direction of the blade body, the upper skin and the lower skin defining a space therebetween, the upper skin and/or lower skin comprises:
a laminated layer extending from the blade root towards the blade tip and at least adjacent from or from the leading edge towards the trailing edge, the laminated layer comprising:
an outer layer wherein the outer layer forms part of the upper and/or lower skin respectively;
an inner layer spaced from the outer layer in the thickness direction of the blade body; and
an intermediate layer sandwiched between the outer layer and inner layer, the intermediate layer comprising:
a plurality of openings extending through the intermediate layer from the inner layer to the outer layer; and
a plurality of corresponding heat conductor elements extending through the plurality of openings from the inner layer to the outer layer for transferring heat from the inner layer to the outer layer,
wherein the blade further comprises heat transfer paths adjacent the inner layer and within the space between the upper and lower skins, the heat transfer paths extending longitudinally from the blade root towards or to the blade tip for conducting heat from the blade root towards or to the blade tip so as to transfer the heat to the heat conducting elements via the inner layer.

14. The wind turbine blade according to claim 13, wherein the heat transfer paths includes channels adapted to guide a heat transfer fluid there-along such that heat is transferred from the blade root towards or to the blade tip via the fluid.

15. The wind turbine blade according to claim 14, further comprising a return fluid duct within the space between the upper and lower skins and in fluid communication with the channels for directing the fluid back towards the blade root so that the fluid can be re-circulated into the channels.

16. The wind turbine blade according to claim 14, wherein the fluid is air.

17. The wind turbine blade according to claim 13, further comprising an exhaust air vent through the upper or lower skin, the exhaust air vent being in fluid communication with the channels for releasing the fluid into the environment.

18. The wind turbine blade according to claim 13, wherein the outer layer completely forms the upper and/or lower skin.

19. The wind turbine blade according to claim 13, wherein the intermediate layer comprises or is formed by a foam layer.

20. The wind turbine blade according to claim 13, wherein a concentration of openings and/or heat conducting elements and/or the number of openings and/or heat conducting elements per unit area running adjacent the leading edge is higher than a concentration of openings and/or heat conducting elements and/or the number of openings and/or heat conducting elements per unit area along the blade body away from the leading edge.

* * * * *